United States Patent [19]

Taguchi et al.

[11] 4,312,795
[45] Jan. 26, 1982

[54] PAINT COMPOSITION COMPRISING POWDER PAINT DISPERSED IN AQUEOUS RESIN SOLUTION

[75] Inventors: Michiichi Taguchi, Funabashi; Kunio Funabiki, Yokohama; Masao Nakazima, Yokosuka; Hisao Nunokawa, Yokosuka; Tadashi Ikemi, Yokosuka; Masataka Kimura, Yokohama; Naoki Shibata, Kawasaki, all of Japan

[73] Assignee: Nissan Motor Co., Ltd., Yokohama, Japan

[21] Appl. No.: 158,564

[22] Filed: Jun. 11, 1980

[30] Foreign Application Priority Data

Jun. 15, 1979 [JP] Japan .................................. 54-74606

[51] Int. Cl.$^3$ .................. C09D 3/26; C09D 3/48; C09D 3/733; C09D 5/02
[52] U.S. Cl. ...................... 260/18 R; 260/22 R; 260/29.2 R; 260/29.2 EP; 260/29.2 UA; 260/29.2 E; 260/29.6 PM; 260/29.7 EM; 260/DIG. 26; 427/180; 427/189; 427/195
[58] Field of Search ................ 427/180, 189, 195; 260/18 R, 22 R, 29.2 EP, 29.2 E, 29.6 PM, 29.7 EM, DIG. 26, 29.2 UA, 29.2 R

[56] References Cited

U.S. PATENT DOCUMENTS

| | | | |
|---|---|---|---|
| 2,591,904 | 4/1952 | Zola | 260/29.4 UA |
| 3,077,459 | 2/1963 | Hershey et al. | 260/29.2 UA |
| 3,116,827 | 1/1964 | Gilchrist | 260/8 |
| 3,138,568 | 6/1964 | Sears | 260/29.6 MM |
| 3,264,238 | 8/1966 | Wallen | 260/29.6 MH |
| 3,600,346 | 8/1971 | Spatola | 260/22 R |
| 3,879,324 | 4/1975 | Timmons et al. | 260/29.6 PM |
| 3,907,737 | 9/1975 | Marx et al. | 260/29.6 |
| 3,970,621 | 7/1976 | Kondo et al. | 260/29.6 PM |
| 3,980,732 | 9/1976 | Isaksen et al. | 427/195 |
| 3,992,478 | 11/1976 | Kamosaki et al. | 260/857 |
| 4,022,737 | 5/1977 | Sekmakas et al. | 260/29.4 |
| 4,122,055 | 10/1978 | Tugukuni et al. | 260/29.4 |
| 4,140,728 | 2/1979 | Hahn et al. | 427/195 |
| 4,172,822 | 10/1979 | Patzschke | 260/29.2 E |
| 4,190,714 | 2/1980 | Isaksen et al. | 427/195 |

FOREIGN PATENT DOCUMENTS 2152515 10/1970 Fed. Rep. of Germany .
2729892 1/1978 Fed. Rep. of Germany .

*Primary Examiner*—Ronald W. Griffin
*Attorney, Agent, or Firm*—Schwartz, Jeffery, Schwaab, Mack, Blumenthal & Koch

[57] ABSTRACT

A paint composition comprising a powder paint uniformly dispersed in an aqueous solution of a water soluble carboxylated resin. Use is made of a powder paint having a mean particle size of 1–100 microns and preferably comprising a thermosetting resin as the vehicle. This paint composition contains no surfactant but, nevertheless, features high stability of the dispersion phase and can provide paint films of excellent resistance to water. This paint composition may utilize recovered waste powder paint, i.e. a mixture of differently colored powder paints, preferably with the addition of a black pigment such as carbon black.

12 Claims, No Drawings

PAINT COMPOSITION COMPRISING POWDER PAINT DISPERSED IN AQUEOUS RESIN SOLUTION

BACKGROUND OF THE INVENTION

This invention relates to a paint composition of an aqueous slurry type the solid component of which is a powder paint.

Much attention and studies have already been given to aqueous paints of the type comprising a powder paint dispersed in water. A vital technological problem about this type of paints is how to realize satisfactorily stable dispersion of solid paint particles in water. One of conventionally prevailing measures for this purpose is to extremely reduce the size of paint particles, for example to the extent of about 5 microns, in advance of dispersing the particles in water. However, it takes much time and is not easy to accomplish atomization of a powder paint into desirably fine particles, and, furthermore, even though extremely fine paint particles are employed gradual sedimentation of the paint particles which are inherently insoluble in water is inevitable when the paint is left standing for a long period of time, resulting in that an initially realized uniform dispersion phase separates into a very dilute upper layer and an extremely solid-rich lower layer, meaning that the paint is no longer of practical use.

Another measure for stabilizing dispersion of paint particles in water is to add a certain dispersion-promoting agent such as a surfactant to the paint. This measure is easy to perform and quite effective for realizing a uniform dispersion phase and preventing sedimentation of paint particles. However, the presence of a surfactant in the aqueous paint causes paint films formed by the application of this paint to become considerably inferior in durability and poor in water resistance. Therefore, satisfaction has not yet been reached by the use of a surfactant either.

In various fields of industries where powder paints are used, another matter of concern is that the reuse of recovered powder paints is difficult. In general, the merits of using powder paints reside in little fear of creating pollution problems and much possibility of recovering and reusing the paints. In practice, however, the reuse of recovered powder paints become often impracticable. For example, where articles are painted in a variety of colors as in the final coat of automobiles or household electric appliances, powder paints are recovered in a state of a compound color paint and, hence, can hardly be reused in the recovered state. Therefore, powder paints recovered in such fields of industries are now used merely as fillers or extenders for plastic moulding materials, dedonors, rubbers, etc. Of course, such a manner of reuse cannot be deemed worthy of powder paints which are relatively high-priced materials.

SUMMARY OF THE INVENTION

It is an object of the present invention to provide a paint composition of an aqueous slurry type using a powder paint, which paint composition features high stability of dispersion of the paint particles in the aqueous medium but contains no surfactant and accordingly can provide paint films of excellent properties including high resistance to water.

It is another object of the invention to provide a paint composition of the above stated type, which paint composition has the above stated advantages and, furthermore, can be prepared by utilizing recovered powder paint as a mixture of two or more differently colored paints.

A paint composition according to the invention is of an aqueous slurry type comprising an aqueous solution of a water soluble carboxyl-containing resin and a powder paint uniformly dispersed in the aqueous resin solution, wherein the particles of the powder paint have a mean particle size in the range from 1 micron to 100 microns.

Preferably use is made of a powder paint the vehicle of which is a thermosetting resin, and the weight ratio of the powder paint to the water soluble resin is made to fall within the range from 0.1:1 to 100:1 on the solid basis.

Because of a good affinity of a carboxyl-containing resin with a powder paint, the particles of the powder paint can be dispersed in the resin solution with very high stability and do not tend to sediment even when the paint composition is left standing for a long period of time although the paint composition does not contain any surfactant.

Since quite uniform and stable dispersion of powder paint particles is achieved by the present invention, it is permissible that the powder paint in the present invention is a mixture of two or more different kinds of powder paints which may be recovered powder paints. In the case of using two or more differently colored powder paints, preferably a paint composition according to the invention is rendered a black paint composition by incorporating therein an adequate quantity of a black-colored pigment such as carbon black.

DESCRIPTION OF THE PREFERRED EMBODIMENTS

A powder paint used in the present invention is a powdered paint composed of a synthetic resin serving as a vehicle, a cross-linking agent, an extender, a coloring pigment and optional additive(s). The particles of the powder paint may be as fine as a few microns in mean particle size, but the use of such extremely fine paint particles is not a requisite to a paint composition according to the invention. Owing to the use of a water soluble carboxyl-containing resin, a uniform and highly stable dispersion phase can be obtained even though the paint particles are larger than 50 microns (but not larger than 100 microns) in mean particle size.

A choice may be made among conventional powder paints which are classified into two types, that is, one type characterized by the use of a thermoplastic resin as the vehicle and the other type characterized by the use of a thermosetting resin. In the former type powder paints, examples of useful thermoplastic resins are polyethylene, polyamide, polyester, polyvinyl chloride and polyfluorethylene resins and cellulose derivatives. In the present invention, however, it is preferable to use a powder paint of the latter type because thermosetting resins used in this type of paints are better than thermoplastic resins in affinity with carboxyl-containing water soluble resins and can provide paint films superior in resistance to water. In this type of powder paints, typical examples of thermosetting resins are epoxy resins, polyester resins of thermosetting type and acrylic resins of thermosetting type.

Conventional epoxy-base powder paints popular as undercoat paints are of use in the present invention, which powder paints may comprise a bisphenol A type epoxy resin, a novolac type epoxy resin or an alicyclic epoxy resin. As a cross-linking agent for the epoxy resins, a choice may be made among, for example, dicyandiamide and its derivatives; acid anhydrides such as phthalic anhydride, trimellitic anhydride, pyromellitic anhydride, hexahydrophthalic anhydride, maleic anhydride and succinic anhydride; aromatic diamines such as ethylenediamine, metaphenylenediamine, 4,4'-diamino-diphenylmethane, 4,4'-diamino-diphenyl sulfone and 4,4'-diamino-diphenyl ether; imidazole and dihydrazide.

Conventional polyester-base powder paints of use in the present invention are ones utilizing a saturated polyester resin as the vehicle. A saturated polyester resin for this class of paint is obtained by a condensation polymerization reaction between a saturated poly-basic acid or its anhydride and a polyalcohol. Examples of dibasic acids and acid anhydrides used for this purpose are phthalic acid, phthalic anhydride, isophthalic acid, terephthalic acid, hexahydrophthalic anhydride, tetrachlorophthalic anhydride, pyromellitic anhydride, succinic acid and adipic acid, while examples of useful polyols are ethylene glycol, diethylene glycol, triethylene glycol, propylene glycol, dipropylene glycol, glycerine, trimethylolpropane, pentaerythritol, neopentyl glycol and hydrogenated bisphenol A.

Cross-linking agents for this type of polyester resins are acid anhydrides such as pyromellitic anhydride, trimellitic anhydride, phthalic anhydride, hexahydrophthalic anhydride and succinic anhydride; aminoplasts such as hexamethoxymethylolmelamine, trimethylolmelamine trimethyl ether, hexamethylolmelamine hexamethyl ether, hexamethylolmelamine and trimethylol-benzoguanamine; and isocyanates such as blocked hexamethylene-diisocyanate and polymethylene-polyphenyl-isocyanate.

Conventional thermosetting acrylic powder paints usually used for finish coat are also of use in the present invention. A thermosetting acrylic resin to serve as the vehicle in this class of powder paints is obtained by copolymerization of a functional monomer and a non-functional monomer, and a wide variety of copolymers can be obtained by variously combining the two types of monomers.

Examples of useful functional monomers are acrylic acid, methacrylic acid, 2-hydroxyethylacrylate, 2-hydroxyethylmethacrylate, 2-hydroxypropylacrylate, 2-hydroxypropylmethacrylate, 3-hydroxyethylacrylate, 3-hydroxypropylmethacrylate, diethylene glycol acrylate, diethylene glycol mathacrylate, glycidylacrylate and glycidylmethacrylate.

Examples of useful non-functional monomers are "soft" monomers such as ethylacrylate, n-propylacrylate, isopropylacrylate, n-butylacrylate, isobutylacrylate, sec-butylacrylate, 2-ethylhexylacrylate, 2-ethylhexylmethacrylate, laurylacrylate and vinyl propionate; and "hard" monomers such as methylmethacrylate, methylacrylate, ethylmethacrylate, n-propylmethacrylate, isopropylmethacrylate, n-butylmethacrylate, isobutylmethacrylate, styrene, acrylonitrile, methacrylonitrile and vinyl acetate.

In this class of powder paints, the selection of a cross linking agent is made based on the type of the functional radicals of the employed acrylic resin. Where the functional radicals of the resin are hydroxyl radicals, examples of suitable cross-linking agents are acid anhydrides, amino-plasts and isocyanates listed hereinabove as useful for polyester resins, alkoxymethyl isocyanate and carboxyl-containing acrylic resins. Where the functional radicals of the resin are carboxyl, the cross-linking agent may be selected among di-epoxy compounds, polyoxazolines and polydioxanes. Where the functional radicals of the resin are glycidyl, examples of suitable cross-linking agents are polycarboxylic acids and their anhydrides such as phthalic acid, phthalic anhydride, trimellitic anhydride and pyromellitic anhydride; polyphenols such as catecol, resorcin, hydroquinone, pyrogallol and fluoroglumine; polyamines such as ethylenediamine, metaphenylenediamine, 4,4'-diphenylmethane, 4,4'-diamino-diphenyl sulfone and 4,4'-diamino-diphenyl ether.

A water soluble carboxyl-containing resin can be selected among carboxylated maleated oils, carboxylated alkyd resins, carboxylated epoxy resins, carboxylated liquid polybutadienes and carboxylated acrylic resins.

A water soluble resin of maleated oil type is derived from a natural drying oil by the addition of maleic anhydride to the oil at its double bonds thereby introducing carboxyl radicals. As a natural drying oil, use can be made of linseed oil, castor oil, soy bean oil or tung oil by way of example.

A water soluble alkyd resin is obtained by introducing carboxyl radicals to an alkyd resin at the stage of polymerization reaction between a polybasic acid or its anhydride and a polyol. Examples of useful polybasic acids and their anhydrides are phthalic acid, phthalic anhydride, isophthalic acid, terephthalic acid, adipic acid, succinic acid and trimellitic anhydride. Examples of useful polyols are ethylene glycol, diethylene glycol, triethylene glycol, propylene glycol, dipropylene glycol, glycerine, trimethylolpropane, pentaerythritol, neopentyl glycol and hydrogenated bisphenol A.

A water soluble epoxy resin is obtained by introducing carboxyl radicals to an epoxy resin by, for example, first preparing an oxyester by making an epoxy compound react with fatty acids of a drying oil and then adding maleic anhydride to the fatty acids of this ester. For example, linseed oil, castor oil, soy bean oil or tung oil can be used as the drying oil for this process.

A water soluble polybutadiene resin can be obtained by introducing carboxyl radicals to polybutadiene by, for example, adding an unsaturated carboxylic acid such as maleic anhydride to the double bonds of the polybutadiene. The type of the polybutadiene may be 1,2-polybutadiene, 1,4-polybutadiene or a copolymer of 1,2- and 1,4-butadienes.

A water soluble acrylic resin used in the present invention is a copolymer which contains free carboxyl radicals in the molecule and is obtained by copolymerization of an acrylic ester and an α- or β-unsaturated calboxylic acid optionally together with a certain other monomer. Examples of useful α- or β-unsaturated carboxylic acids are acrylic acid, methacrylic acid, cinnamic acid, crotonic acid, fumaric acid, citraconic acid and maleic anhydride. Examples of useful acrylic esters are methylacrylate, ethylacrylate, n-propylacrylate, isopropylacrylate, n-butylacrylate, isobutylacrylate, sec-butylacrylate, 2-ethylhexylacrylate and laurylacrylate. Examples of monomers optionally incorporated in the copolymer are methylmethacrylate, ethylmethacrylate, isopropylmethacrylate, n-butylmethacrylate, 2-ethylhexylmethacrylate, laurylmethacrylate and styrene.

A paint composition according to the invention usually contains a neutralizing agent which is a basic compound capable of neutralizing free carboxyl radicals contained in the molecule of the water soluble resin.

For example, the neutralizing agent may be selected among amines such as monomethylamine, dimethylamine, trimethylamine, monoethylamine, diethylamine, triethylamine, monoisopropylamine, diisopropylamine, diethylenetriamine, triethylenetetramine, monoethanolamine, diethanolamine, triethanolamine, monoisopropanolamine, diisopropanolamine, dimethylethanolamine, morpholine, methylmorpholine and piperazine; ammonia and inorganic salts such as sodium hydroxide, potassium hydroxide and lithium hydroxide.

The amount of the neutralizing agent is determined by a pH value the paint composition is desired to exhibit. In the present invention the pH of the paint composition is made to be not smaller than 7, considering subsidiary factors such as odour of the paint composition, it is preferable that the pH falls within the range from 7 to 9. A selected neutralizing agent is used in an amount appropriate to realize such a pH value of the paint composition.

Preferably the aqueous resin solution is prepared by using de-ionized water, but it is also permissible to use service water. The amount of water is determined with consideration of the intended viscosities of the resin solution and the paint composition and expected thickness of paint films to be formed by the application of this paint composition.

If desired, a part of the water in the resin solution may be replaced by a hydrophilic organic solvent such as methanol, ethanol, ethylene glycol monomethyl ether, ethylene glycol monoethyl ether, ethylene glycol monoisopropyl ether, ethylene glycol monobutyl ether, isopropanol or dimethylformamide. In this case, the amount of the organic solvent is limited such that the weight ratio of the organic solvent to the powder paint in the resultant paint composition is not greater than 0.5:1.

The proportion of the water soluble resin to the powder paint in a paint composition according to the invention is determined with consideration of the stability of dispersion of the paint particles in the aqueous resin solution and properties of paint films formed by the application of this paint composition. At least 1 (one) part by weight of a water soluble resin is used for 100 parts by weight of powder paint because if the amount of the water soluble resin is smaller the stability of dispersion of the paint particles becomes unsatisfactory. Considering the properties of the paint films, particularly rust-preventing and water-resisting properties, there is an upper boundary to the amount of the water soluble resin. Numerically, the weight ratio of the water soluble resin to the powder paint is not made to exceed 10:1. The use of a larger amount of the resin is unfavorable particularly to the water resistance of the paint films. Thus, the weight ratio of the powder paint to the water soluble resin in a paint composition according to the invention is determined within the range from 0.1:1 to 100:1 on the solid basis, and it is preferable that this weight ratio falls within the range from 1:1 to 50:1.

Even when the powder paint in a paint composition of the invention is a recovered waste powder paint and is a mixture of two or more differently colored paints, a uniform and stable dispersion of the paint particles in the aqueous resin solution can be achieved. However, in such a case it is likely that paint films formed by the application of the paint composition become mottled or indefinite in color tone. In such a case, therefore, it is preferable that a paint composition of the invention is made to contain at least 3 parts by weight, and preferably 5 to 20 parts by weight, of a black-colored pigment in finely powdered form such as carbon black to 100 parts by weight of the powder paint in the composition so that the paint composition can always provide definitely black paint films irrespective of the original colors of the reused powder paints. Thus, the present invention enables to effectively reuse waste powder paints collected and recovered in electrostatic painting or fluidized-bed painting processes and, hence, contributes to the saving of resources.

In the preparation of a paint composition according to the invention, the respective materials may be mixed in any sequence. However, in view of ease of stirring and completeness of dispersion of paint particles, it is suitable to accomplish the preparation in the sequence of first mixing a water soluble carboxyl-containing resin, a neutralizing agent and water to prepare an aqueous resin solution and then adding a powder paint to the resin solution and, if intended, adding a black-colored pigment to the resin solution after dispersion of the paint particles therein.

The preparation of the paint composition can be performed by using a conventionally employed mixing and dispersing apparatus such as a ball mill, paint mixer or roll mill.

The present invention will be illustrated by the following examples.

EXAMPLE 1

An aqueous resin solution was prepared by adding 40 g of triethylamine (neutralizing agent) and 1000 g of water to 200 g of a maleated polybutadiene resin (LPB-M 2000-80 of NIPPON PETROLEUM CHEMICALS CO.) having an average molecular weight of 2000 and an acid value of 80 (mg KOH/g) and continuing stirring of the resultant mixture for about 30 minutes. Then 1000 g of a red powder paint (POWDAX A of NIPPON PAINT Co.) was added to the aqueous resin solution. This powder paint had a mean particle size of 50 microns and employed a thermosetting acrylic resin as the vehicle. The paint-containing solution was subjected to 24-hour mixing in a ball mill to uniformly disperse the paint particles in the solution. A resultant slurry was filtered by using a 150-mesh sieve to remove coarse particles that might be present in the slurry, and the preparation of an aqueous slurry type paint composition according to the invention was completed.

The pH of this paint composition was 8.2, and the consistency was 40 sec (Ford Cup No. 4). This paint composition was left standing for a period of 2 weeks, but there occurred no sedimentation of the paint particles, so that excellent stability of dispersion of the paint particles in this composition was evidenced. This paint composition was diluted with water to lower the consistency to 28 sec and then sprayed onto a degreased steel plate. The paint-coated steel plate was dried at room temperature for 15 min and then baked at 180° C. for 30 min to form a fixed paint film. The thickness of the thus formed paint film was about 30 microns. The steel plate was subjected to a hot water immersion test of 50° C.×48 hr. After this test no blisters or other defects could be observed in the paint film, so that the paint film could be judged to be highly resistant to water.

EXAMPLE 2

The preparation of the aqueous resin solution in Example 1 was repeated, and 1000 g of a white powder paint (POWDAX A NIPPON PAINT Co.) was uniformly dispersed in this resin solution by the same mixing procedure as in Example 1. This powder paint had a mean particle size of 40 microns and comprised a thermosetting acrylic resin as the vehicle. A paint composition thus prepared exhibited a pH value of 8.6 and a consistency value of 36 sec (Ford Cup No. 4). There occurred no sedimentation of the paint particles when this paint composition was left standing for 2 weeks. This paint composition was diluted with water until the consistency lowered to 28 sec and then sprayed onto a degreased steel plate, followed by the film-fixing procedure of Example 1. A resultant paint film had a thickness of about 25 microns and exhibited no blisters or other defects when subjected to a hot water immersion test of 50° C. ×48 hr.

EXAMPLE 3

An aqueous resin solution was prepared in exact accordance with Example 1, and a mixture of three kinds of (red-, white- and yellow-colored) powder paints (all POWDAX A of NIPPON PAINT Co.) was uniformly dispersed in this resin solution by the mixing procedure of Example 1. Each of these powder paints had a mean particle size of about 50 microns. The total quantity of the mixed powder paints was 1000 g, and the proportion of (red): (white):(yellow) was 3:2:1 by weight.

An aqueous slurry type paint composition thus prepared exhibited a pH value of 8.3 and a consistency value of 36 sec (Ford Cup No. 4). This paint composition was left standing for 2 weeks, but a uniform dispersion phase was retained without the occurrence of sedimentation of the paint particles. This paint composition was diluted with water to lower the consistency to 28 sec and then sprayed onto a degreased steel plate, followed by the film-fixing procedure of Example 1. A resultant paint film had a thickness of about 28 microns and, after a hot water immersion test of 50° C.×48 hr, exhibited no blisters or other defects. In appearance, this paint film was somewhat mottled in limited areas, but the degree of mottling was not so significant as offered a problem from a practical viewpoint.

EXAMPLE 4

The aqueous resin solution of Example 1 was prepared once more, and 100 g of the mixed powder paint used in Example 3 and, furthermore, 50 g of carbon black were added to the resin solution and uniformly dispersed therein by the same procedure as in Example 1 to prepare a black-colored aqueous slurry type paint composition.

The pH of this paint composition was 7.6, and the consistency was 45 sec (Ford Cup No. 4). This paint composition was left standing for 2 weeks, but a uniform dispersion phase was retained without the occurrence of sedimentation of the paint and carbon black particles. After dilution of this paint composition with water to lower the consistency to 28 sec, a paint film having a thickness of about 30 microns was formed in accordance with Example 1. In appearance, this paint film was uniformly black and quite satisfactory in color tone. When subjected to a hot water immersion test of 50° C.×48 hr, no blisters or other defects could be observed in this paint film.

EXAMPLE 5

An aqueous solution of the maleated polybutadiene resin used in Example 1 was prepared by mixing 10 g of this resin, 3 g of triethylamine and 800 g of water for about 30 min. Then an aqueous slurry type paint composition was prepared by uniformly dispersing 1000 g of the red-colored powder paint used in Example 1 in this resin solution by the same procedure as in Example 1. The pH of the paint composition was 8.7, and the consistency was 38 sec (Ford Cup No. 4). When this paint composition was left standing for 2 weeks, there occurred sedimentation of a small part of the paint particles. However, the sedimented particles could easily be dispersed again in the resin solution so that the paint composition resumed the initial state of a uniform dispersion phase, without offering any serious problem in practice.

A paint film resulting from the film-forming procedure of Example 1 by using the paint composition of Example 5 had a thickness of about 30 microns and exhibited no blisters or other defects after the aforementioned hot water immersion test.

EXAMPLE 6

An aqueous solution of the maleated butadiene resin used in Example 1 was prepared by mixing 1000 g of this resin, 200 g of triethylamine and 5000 g of water for about 30 min. Then 100 g of the red powder paint used in Example 1 was uniformly dispersed in this resin solution by the procedure of Example 1 to prepare a red-colored paint composition of an aqueous slurry type.

This paint composition exhibited a pH value of 8.4 and a consistency value of 39 sec (Ford Cup No. 4). No sedimentation of the paint particles occurred when this paint composition was left standing for 2 weeks. After dilution of this paint composition with water to lower the consistency to 28 sec, a paint film was formed by the procedure of Example 1. The film thickness was 28 microns, and no blisters or other defects appeared in the paint film when the hot water immersion test of 50° C.×48 hr was carried out.

COMPARATIVE EXAMPLE 1

This example relates to a paint composition which is fundamentally according to the present invention but contains an excessively large amount of powder paint relative to a water soluble resin contained in the aqueous medium.

An aqueous resin solution was prepared by mixing 5 g of the maleated polybutadiene resin used in Example 1, 1.5 g of triethylamine and 700 g of water for 30 min. Then an aqueous slurry type paint composition was prepared by uniformly dispersing in this resin solution 1000 g of the red powder paint employed in Example 1 by the procedure described in Example 1.

The pH of this paint composition was 8.6, and the consistency was 39 sec (Ford Cup No. 4). When this paint composition was left standing for 2 weeks, there occurred sedimentation of a large portion of the paint particles, and it was practically impossible to again disperse the sediment uniformly in the liquid phase of the tested paint composition. Therefore, this paint composition was judged to be unsuitable for practical use.

COMPARATIVE EXPERIMENT 2

This example relates to a paint composition which is fundamentally according to the invention but does not contain a sufficient amount of powder paint.

The resin solution preparing and powder paint dispersing procedures of Example 1 were repeated identically except that the quantity of the powder paint was decreased to only 16 g from 1000 g in Example 1.

An aqueous slurry type paint composition thus prepared exhibited a pH value of 8.2 and a consistency value of 39 sec (Ford Cup No. 4). This paint composition was left standing for 2 weeks, but a uniform dispersion phase was retained without the occurrence of sedimentation of the paint particles. After dilution of this paint composition with water to lower the consistency to 28 sec, a paint film was formed on a degreased steel plate by the coating and fixing procedures of Example 1. As the result of a hot water immersion test of 50° C.×48 hr, very small blisters were observed in the tested paint film, and this paint film was judged to be insufficient in water resistance.

REFERENCE 1

This reference relates to an aqueous slurry type paint composition not containing a water soluble resin.

An aqueous slurry type paint composition was prepared by adding 1000 g of a red colored powder paint (POWDAX A of NIPPON PAINT Co.) in 1000 g of water and subjecting a resultant slurry to 24-hr mixing in a ball mill to uniformly disperse the paint particles in water. The employed powder paint comprised a thermosetting acrylic resin as the vehicle and had a mean particle size of about 5 microns.

The pH of an aqueous slurry type paint composition thus prepared was 6.8, and the consistency was 29 sec (Ford Cup No. 4). This paint composition was inferior in the stability of the dispersion phase as demonstrated by sedimentation of a major portion of the paint particles when the paint composition was left standing for 3 days. Moreover, it was practically impossible to again disperse the sedimented paint particles uniformly in the liquid phase of the paint composition. Therefore, this paint composition could not be put into practical use.

REFERENCE 2

This Reference relates to the use of a surfactant in an aqueous slurry type paint composition not containing a water soluble resin.

An aqueous slurry type paint composition was prepared generally in accordance with Reference 1 except that 20 g of an anionic surface active agent (a condensate between formamide and sodium naphthalene sulfonate) was added as a dispersion promoter.

The pH of the obtained paint composition was 7.2, and the consistency was 34 sec (Ford Cup No. 4). This paint composition was satisfactory in the stability of the dispersion phase as demonstrated by the occurrence of no sedimentation of the paint particles when left standing for 2 weeks.

Using this paint composition, a paint film about 30 microns in thickness was formed on a degreased steel plate by the same procedure as in Example 1. When this paint film was subjected to a hot water immersion test of 50° C.×48 hr, many and large blisters appeared in the tested film, and rust was perceptible in the blistered regions. Thus, this paint film was very poor in water resistance.

What is claimed is:

1. A paint composition of an aqueous slurry type, comprising:
   an aqueous solution of a water soluble carboxyl-containing resin; and
   a powder paint uniformly dispersed in said aqueous solution, the particles of said powder paint having a mean particle size in the range from 1 micron to 100 microns, said powder paint being a mixture of at least two kinds of powder paints different in color and comprising a thermosetting resin as a vehicle;
   said carboxyl-containing resin having a good affinity with said powder paint.

2. A paint composition according to claim 1, wherein the weight ratio of said powder paint to said water soluble carboxyl-containing resin is in the range from 0.1:1 to 100:1 on the solid basis.

3. A paint composition according to claim 2, wherein said weight ratio is in the range from 1:1 to 50:1

4. A paint composition according to claim 2, wherein said water soluble carboxyl-containing resin is selected from the group consisting of carboxylated drying oil resins, carboxylated alkyd resins, carboxylated epoxy resins, carboxylated liquid polybutadiene resins and carboxylated acrylic resins.

5. A paint composition according to claim 4, further comprising a basic compound as a neutralizing agent in such a quantity that the pH of the paint composition is not lower than 7.0.

6. A paint composition according to claims 2,4 or 5, wherein the thermosetting resin is selected from the group consisting of thermosetting epoxy resins, thermosetting polyester resins and thermosetting acrylic resins.

7. A paint composition according to claim 2, wherein said aqueous solution comprises water and a hydrophilic organic solvent, the weight ratio of said organic solvent to said powder paint being not greater than 0.5:1.

8. A paint composition according to claim 1, wherein said powder paint is a mixture of recovered waste powder paints.

9. A paint composition according to claims 1 or 2, further comprising a black-colored pigment uniformly dispersed in said aqueous solution, the weight ratio of said pigment to said powder paint being at least 0.03:1.

10. A paint composition according to claim 9, wherein said weight ratio of said pigment to said powder paint is in the range from 0.05:1 to 0.2:1.

11. A paint composition according to claim 9, wherein said pigment is carbon black.

12. A paint composition according to claim 1 wherein said carboxyl-containing resin is a maleated polybutadiene resin.

* * * * *